Patented Aug. 21, 1951

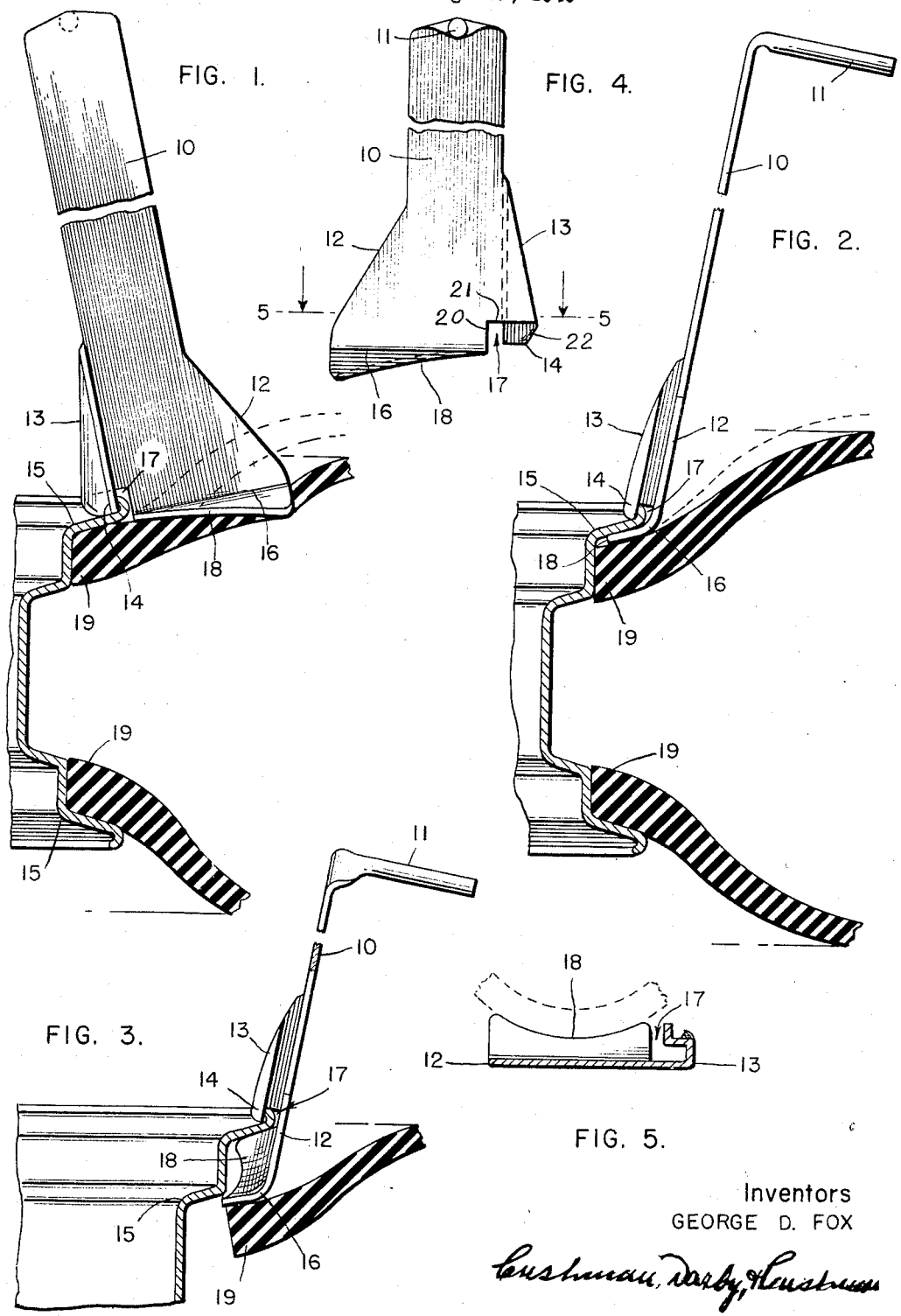

2,565,216

UNITED STATES PATENT OFFICE 2,565,216

TIRE BEAD LOOSENING HAND LEVER

George D. Fox, Pontiac, Mich.

Application August 27, 1946, Serial No. 693,282

3 Claims. (Cl. 157—1.17)

This invention relates to tire tools. It has for its object to provide a tool of simple, rugged construction which will effectively separate a tire bead from a rim. It is so designed that the separating operation may be performed without danger of injury to the tire and without the use of a hammer or other tool to break the tire from the casing. Its action is positive and its manipulation easy, so that, in the hands of unskilled persons, it can be efficiently used.

This case is a continuation-in-part of copending application, Serial No. 680,236, filed June 28, 1946, now abandoned.

Briefly, it comprises a tool formed of a single piece of metal of suitable gauge to give the required strength and having as essential elements, a rim-engaging member which will hook over the edge of the rim, and on which rim the member may be rotated and rocked, and a bead-engaging flange offset from said rim-engaging member by a notch for rim edge clearance, said bead-engaging flange being thrust between the rim and tire when the tool is rotated on the rim-engaging member. From this position, with the bead-engaging flange snugly between the rim and the bead, the tool will be pulled toward the operator in a more or less circumferential direction relative to the tire and rim, and force the bead away from the rim, the flange being of such design that it exerts a smooth pressure, over a considerable area, on the tire and no tire damage by sharp edge or corner contacts can occur.

Other advantages will appear from the detailed description which follows, taken in connection with the accompanying drawings, which are a part of this disclosure, and the features of novelty and utility of the invention will be defined in the appended claims.

In the drawings:

Figure 1 is a view of the tool in its initial position, with the rim engaging member in rim contact and the tire engaging flange in contact with the tire.

Figure 2 is a view showing the flange between the rim and tire after the tool has been rotated on its rim-engaging member.

Figure 3 shows the positions of the parts after the tool has been pulled from the position shown in Figure 2 and the bead and rim separated.

Figure 4 is a detail view to show the relation of the rim-engaging member and the bead-engaging flange.

Figure 5 is a sectional view on substantially the line 5—5, Figure 4, looking in the direction of the arrows.

Referring to the drawings by numbers, the same numbers designating the same parts in the several views, the tool will be stamped from a suitable blank and shaped to form. It is provided with the handle 10 which may be of any suitable length to give a proper leverage for manipulating the handle, and at its upper end will be provided with a hand grip 11 which may be conveniently formed by rolling the end of the blank to form the grip. At its lower end the tool is provided with a flared or fan-shaped head 12, one vertical edge of the head 12 being bent or rolled inwardly to form a flange 13 which terminates at its lower end in a foot 14 adapted to engage the side 15 of the rim. The rim, as here shown, is a drop bottom rim and the tool is designed particularly for use in connection with rims of that type.

The lower end of the flared head 12 is bent outwardly to form a flange 16, said flange being separated from the foot 14 of the flange 13 by a notch generally indicated at 17, which notch, as shown in Figures 2 and 3, engages the edge 15 of the rim. Referring to Figures 3 and 4, the notch 17 is formed as by stamping or cutting out the lower portion of the head 12 and vertical flange 13 along the boundary lines designated at 20, 21 and 22. The boundary edge 21 originating on the head 12 at the juncture of edge 20, extends around the lower edge of the vertical flange 13 and joins with the curved edge 22 on the foot 14. The flange 16 is preferably inclined downwardly lengthwise from the notch 17, as shown in Figure 4, and has a curved edge 18, as shown in Figure 5, to make rim contact when the tool is in separating position between the edge of the rim 15 and the bead 19 of the rim, the tire and rim being conventionally shown in cross section. Thus, it will be seen that the notch 17 is formed at the juncture or corner of the head 12 and flange 16 with the outwardly diverging side 13, and that the rim-engaging portion of the head is of substantially channel shape in cross section, as clearly shown in Figure 4.

In operation the tool will be placed initially as shown in Figure 1, with the foot 14 of the flange 13 resting on the side of the rim 15, the edge of the rim engaging in the notch 17. It will be noted that the portion of the notch 17, as shown in Figure 1, is cut out of the flat portion of the head 12. From the position shown in Figure 1, the tool will be rotated on the foot 14 to the position shown in Figure 2, the flange 16 being thrust between the tire bead 19 and the edge 15 of the rim. The portion of the notch 17 appearing in Figure 2 is cut out of the lower portion of the flange 13. The longitudinal inclined tire-engaging flange 16 is separated from the rim-engaging foot 14 by the notch 17 which assists in permitting the tire tool to be rotated and rocked relative to the rim. The inclined shape and curved edge of the flange 16 permits it to enter smoothly and easily, as it is advanced on rotation of the tool, between the tire and the rim until it is brought finally to the position shown in Figure 2, with the curved edge 18 adjacent the rim wall, so that flange 16 fits snugly between the tire and rim.

The tool will then be pulled toward the operator in a direction generally circumferential to the tire and rim, rocking on the foot 14 of the flange 13 from the position shown in Figure 2 to the position shown in Figure 3, and the flange 16 will break the tire bead 19 away from the rim with a positive and smooth action and without any danger of injuring the tire. It will be seen that the flange 16 which contacts the tire bead has a smooth contact surface, and there are no sharp edges or corners to injure the tire. When the flange 16 is thrust between the rim and the bead of the tire and brought to a position where the curved edge 18 is adjacent the vertical wall of the rim, as shown in Figures 2, 3, and 5, pull on the tool to separate the rim and bead exerts the pressure of flange 16 over a considerable circumferential area, so that there is no danger of exerting injurious pressure at segregated points on the tire. Usually when the bead 19 is broken away at one point by the action of the tool, the tire and rim can be readily separated throughout their entire circumference, but if there should be other adherent points between tire and rim which need breaking out, the tool may be moved to those points and rocked to break out successive portions of the tire. The length of the flange 16 may, of course, be increased or diminished to meet any conditions, but it should be of sufficient length and width so as to enable the user to break out the bead without difficulty.

The tool which is here disclosed is simple in construction and efficient in operation. It may be cheaply constructed of readily obtainable material and the operations for forming it are simple stamping and flanging operations, without the necessity of any complicated mechanical work.

Such departures from this disclosure as amount only to the exercise of mechanical skill are, of course, within the range of the invention as defined in the appended claims.

I claim:

1. A tire tool comprising a handle, a head on said handle having a rim-engaging member on which the tool is rotatable and rockable relative to a rim, a longitudinally inclined tire-engaging flange separated from said rim-engaging member by a rim edge-engaging notch, said flange being movable to a position between the rim and tire when the tool is rotated on its rim-enaging member, and movable to effect tire and rim separation when the tool is rocked on its rim-engaging member, said inclined flange having a curved rim-contacting edge.

2. A tire tool having a handle, a head on said handle, a vertical flange with a rim-engaging foot bent out from one side of said head, and a horizontal tire engaging flange bent out from the bottom of said head and separated from said vertical flange by a rim-edge engaging notch whereby said tool is rotatable and rockable relative to a rim engaged by said rim-engaging foot.

3. A tire tool comprising a handle having a head at one end thereof, said head on one side being provided with a rim-engaging portion, the outer end of said head having a lateral flange arranged to engage the tire, and the juncture of the head and said flange with the rim-engaging side of the tool being cut away to form a notch in said head and side to facilitate rotation and rocking of the tool when engaging the rim, said flange being movable to a position between the rim and the tire when the tool is rotated on its rim-engaging portion and movable to effect tire and rim separation when the tool is rocked on its rim-engaging portion.

GEORGE D. FOX.

REFERENCES CITED

The following references are of record in the file of this patent:

UNITED STATES PATENTS

| Number | Name | Date |
| --- | --- | --- |
| 1,208,184 | Mayer | Dec. 12, 1916 |
| 1,250,180 | Hughes | Dec. 18, 1917 |
| 1,444,226 | Wallace | Feb. 6, 1923 |
| 1,448,211 | Grassfield | Mar. 13, 1923 |
| 2,226,757 | Ewell | Dec. 30, 1940 |
| 2,305,886 | Mahler | Dec. 22, 1942 |